Oct. 3, 1967 N. CUNNINGWELL 3,344,722

DATA RECORDER

Filed March 29, 1965 2 Sheets-Sheet 1

INVENTOR.
NATHANIEL CUNNINGWELL

BY

ATTORNEY.

Oct. 3, 1967 N. CUNNINGWELL 3,344,722

DATA RECORDER

Filed March 29, 1965

2 Sheets-Sheet 2

INVENTOR.
NATHANIEL CUNNINGWELL

BY

[signature]

ATTORNEY.

3,344,722

DATA RECORDER

Nathaniel Cunningwell, Hollywood, Calif., assignor to Clary Corporation, San Gabriel, Calif., a corporation of California Filed Mar. 29, 1965, Ser. No. 443,283
3 Claims. (Cl. 95—4.5)

ABSTRACT OF THE DISCLOSURE

A photographic data recorder comprising a continuously rotating drum having transparent characters therearound, a column of transparent marks also therearound arranged in different patterns, a light source energized each time a character passes a printing point to direct light simultaneously through one of the patterns of marks whereby to energize certain of a series of light sensing devices, and a coincidence gate controlled by energized ones of said light sensing devices and by coded circuits representing a character to be printed for causing illumination of one of the transparent characters.

This invention relates to data recorders and has particular reference to recorders for recording data by means of radiant energy, such as visible light, ultraviolet or infrared rays.

A principal object of the present invention is to provide a high speed photographic data recorder.

Another object is to provide a print-on-the-fly type photographic data recorder in which an entire line of characters may be recorded in one revolution of a continuously rotating character bearing member.

Another object is to provide a high speed print-on-the-fly type data recorder in which timing, selection, and recording of characters is accomplished by an electro-optical system.

Another object is to provide a high speed data recorder which is simple and economical to manufacture and yet highly reliable.

The manner in which the above and other objects of the invention are accomplished will be readily understood on reference to the following specification when read in conjunction with the accompanying drawings, wherein.

Referring in detail to the drawings, the recorder comprises a cylindrical print drum, generally indicated at 11, which is mounted on a shaft 12 rotatably supported in bearings 13 and 14. The shaft is rotated continuously by a suitable motor not shown.

Figure 1:
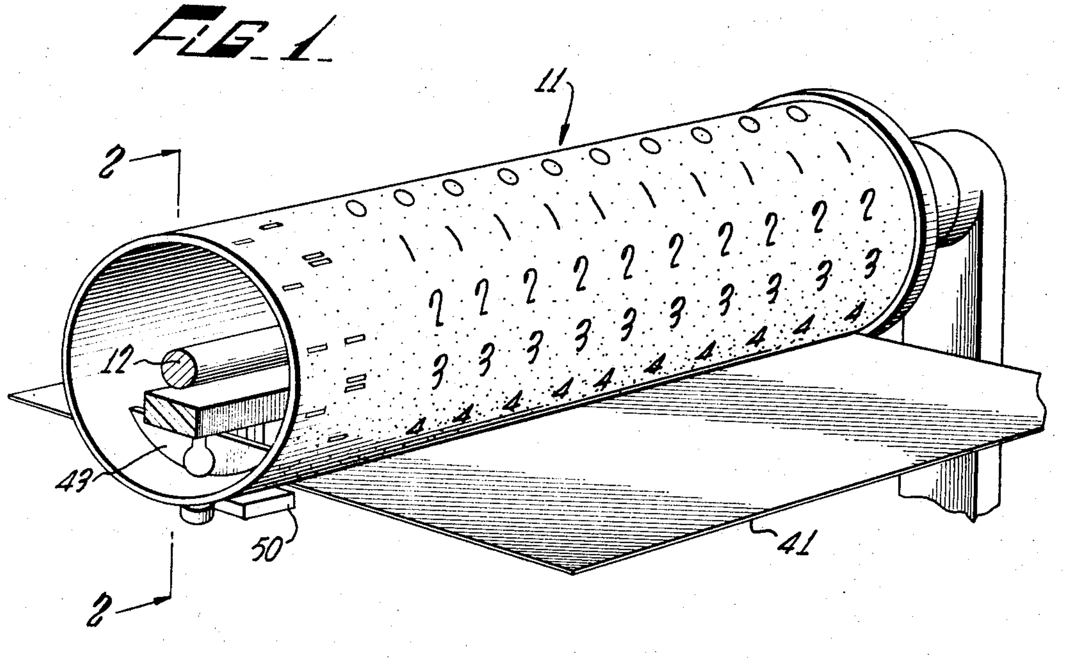
FIG. 1 is a perspective view, with parts broken away, of the data recorder embodying a preferred form of the present invention.
Figure 2:
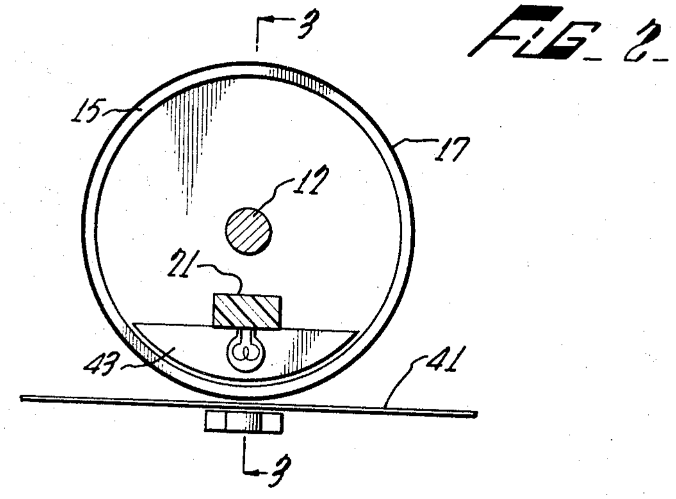
FIG. 2 is a transverse sectional view through the recorder and is taken substantially along the line 2—2 of FIG. 3.
Figure 3:
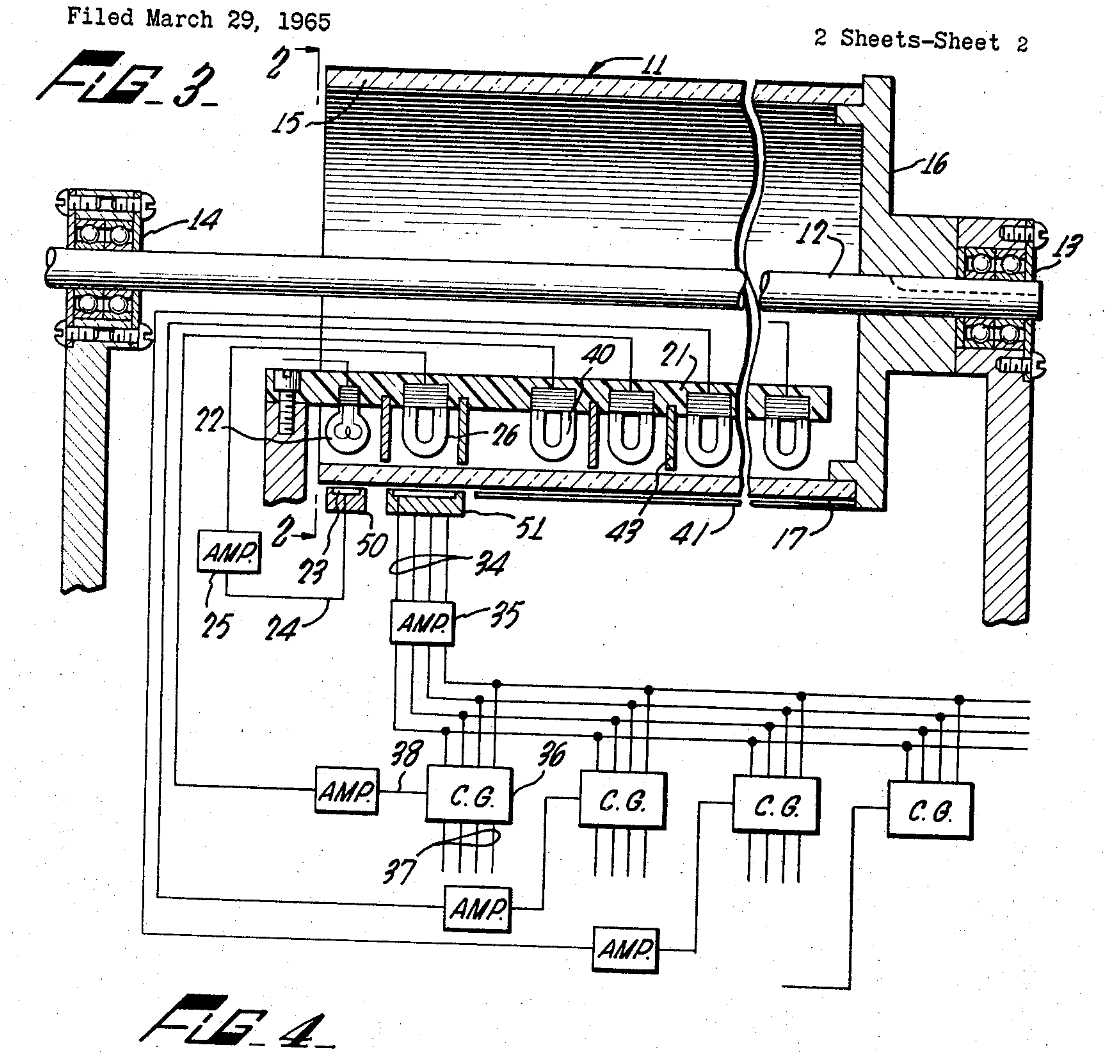
FIG. 3 is a longitudinal sectional view taken substantially along the line 3—3 of FIG. 2.

The drum 11 is open at its lefthand end, as viewed in FIG. 3, and comprises a cylinder 15 preferably of transparent plastic, such as methyl methacrylate, attached at its righthand end to a hub member 16 securely keyed to the shaft 12.

A photographically developed film or the like 17 is suitably secured around the periphery of the cylinder 15 and has formed thereon a plurality of circumferentially extending columns of transparent characters 18, ranging in value from 0 to 9. Such characters are surrounded by an opaque background and are arranged in rows of similar characters extending lengthwise of the cylinder.

A circumferentially extending column of relatively narrow transparent timing marks or striations 20 are also arranged around the drum, the different marks being in alignment with respective ones of the rows of characters.

A stationary bracket 21 of plastic or similar material extends within the drum and along the length thereof. Such bracket is suitably supported from the frame of the recorder and carries a series of electric lamps located in alignment with each other along the length of the cylinder.

One of the lamps, i.e., 22, is aligned with the column of timing marks 20 and with a photo-sensing device 23 mounted in a holder 50 suitably supported in a manner not shown directly adjacent the outer periphery of the cylinder. The sensing device is substantially the same size and shape as each of the timing marks 20 and is connected through a circuit 24 and amplifier 25 to a second lamp 26 aligned with an additional circumferentially extending column of relatively narrow transparent code marks 27 located intermediate the timing marks 20 and the first column of print characters.

The marks 27 are arranged singularly or in groups and are located in alignment with the different rows of print characters. The marks are arranged and located according to the binary equivalent of the particular characters found in the aligned rows.

The column of marks 27 passes over a set of four equispaced photo-sensing devices 30, 31, 32 and 33 connected by respective ones of a group of conductors 34 and amplifying circuits 35 to the upper inputs of a plurality of coincidence gates 36, there being one such gate for each column of print characters 18. The devices 30 to 33 are supported directly adjacent the outer periphery of the cylinder 15 by a holder 51.

The holders 50 and 51 may be adjusted in position a slight amount about the axis of the shaft 12.

Each of the coincidence gates 36 has four lower input lines 37 adapted to be connected to a suitable source of data such as a computer, tape reader, keyboard or the like. When a character representing signal received over one or more of the lines 37 and representing the binary equivalent of a character to be printed matches a corresponding signal transmitted over the lines 34 to the upper inputs, an output signal will be applied through an output line 38 and suitable amplifying circuitry to a lamp, i.e., 40, mounted on the bracket 21 and located in alignment with one of the columns of print characters.

It will be noted that each of the coincidence gates has its output connected to a corresponding one of the series of lamps, similar to lamp 40, and aligned with a respective column of print characters.

Figure 4:
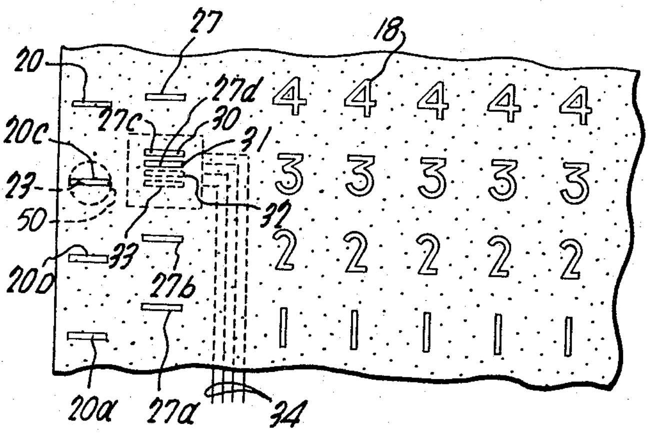
FIG. 4 illustrates a fragmentary section of a developed view of the print drum.

The photo-sensing devices 30 to 33 are of substantially the same size and shape as the code marks 27 and are spaced apart the same distance as are the marks in any one group which contains a number of such marks. For example, the code mark 27*a* representing the row of type characters 1 would, when the corresponding timing mark 20*a* is located in registry with the sensing device 23, be located in alignment with the sensing strip 30. When the timing mark 20*b* is located in registry with the sensing device 23 the code mark 27*b* will be aligned with the sensing strip 31. Likewise, when the timing mark 20*c* is located in registry with the sensing device 23 (as shown in FIG. 4) the code marks 27*c* and 27*d* are located in alignment with the sensing device 30 and 31 and so forth.

A strip of photographically sensitized paper or similar material 41 is suitably guided in close proximity to the outer periphery of the cylinder 15 and is preferably held stationary during the recording operation.

As each of the timing marks 20 pass in alignment with lamp 22 and the sensing device 23, a signal will be generated in the device 23 and transmitted over line 24 to illuminate lamp 22. At this time one or more of the code marks 27 representing the aligned row of print characters will be located in alignment with certain of the photo-sensing devices 30 to 33, causing signals to be applied over an appropriate one or more of lines 34 to the corresponding upper inputs of all of the coincidence gates 36. If, at such time, corresponding signals are applied to the lower inputs of one or more of the coincidence gates, output signals will be applied to the corresponding lamps 40, thereby causing an image of the aligned print character to be projected onto the photosensitive medium 41. After a complete line of characters has been photographically recorded the recording medium 41 is advanced endwise to receive a new line of print. For example, the advancing mechanism shown in Patent No. 3,139,818, issued to W. A. Koehn on July 6, 1964, may be employed for this purpose. The medium 41 may, of course, be subsequently developed in any well known manner to render the imprinted characters thereon visible.

In order to prevent light from any of the lamps from inadvertently imprinting upon adjacent areas of the medium 41, light shields 43 are mounted on the bracket 21 intermediate the different lamps. Also, the recorder is preferably mounted in a darkened enclosure (not shown) to prevent stray light from fogging the recording medium.

It will be noted that the lamps 22, 26 and 40 may be of types capable of projecting different forms of radiant energy other than visible light through the mask or stencil 17, such as ultra-violet or infra-red rays, in which case the photo-sensing devices and recording medium would be chosen to be sensitive to such rays. However, the form of lamp found satisfactory for this purpose is the Model FT-106 flash lamp manufactured by the General Electric Company. Lamp 22 may be of the incandescent or glow type.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto. For example, in lieu of the film 17, a photographic emulsion or other opaque coating could be deposited on the surface of the cylinder 15 and transparent characters could be directly formed therein. Also, data could be transmitted in combinational codes other than the binary code with obvious modifications in the control circuitry. Likewise, the cylinder and circuitry could be modified to record alphabetic or alphanumeric characters.

Having thus described the invention what is desired to be secured by United States Letters Patent is:

1. In a data recording device having a continuously rotating member,
- said member being generally opaque to radiant energy and having a first column of characters spaced therearound,
- said characters being transparent to radiant energy,
- means for guiding a photosensitive medium adjacent a first surface of said member,
- a first source of radiant energy adjacent an opposite surface of said member and in alignment with said first column,
- and a coincidence gate having an output circuit operatively connected to said first source,
- said gate having a first set of inputs and a second set of inputs and effective to energize said first source when a combination of input signals on said first set corresponds with a combination of signals on said second set,
- the combination comprising a second column of transparent marks spaced around said member in different coded patterns representing respective ones of said characters,
- said marks being located in a single line extending along the length of said second column,
- a second source of radiant energy adjacent one of said surfaces of said member and in alignment with said second column,
- radiant energy sensing devices located in a line extending along the length of said second column adjacent the other of said surfaces,
- means responsive to simultaneous sensing of a pattern of said marks by certain of said sensing devices for applying input signals to respective ones of said first set of inputs, and
- means for energizing said second source when each of said characters passes adjacent said photosensitive medium.

2. The combination according to claim 1 wherein said last mentioned means comprises a third column of timing marks around said member,
- said timing marks being spaced from each other distance equal to the spacing between said characters, and
- means for sensing said timing marks and for energizing said second source when said characters pass adjacent said photosensitive medium.

3. The combination according to claim 1 wherein said last mentioned means comprises a third column of timing marks around said member,
- said third column of marks being transparent to radiant energy and spaced from each other distances equal to the spacing between said characters,
- a third source of radiant energy adjacent one of said surfaces and in alignment with said third set of timing marks, and
- a radiant ray sensing element adjacent the other of said surfaces and in line with said third set of marks,
- said ray responsive element being effective upon sensing rays from said third source to energize said second source.

References Cited

UNITED STATES PATENTS

| | | | |
|---|---|---|---|
| 2,692,551 | 10/1954 | Potter | 101—93 |
| 2,714,841 | 8/1955 | Demer | 95—4.5 |
| 2,714,843 | 8/1955 | Hooven | 95—4.5 |
| 2,726,940 | 12/1955 | Buhler | 95—4.5 X |
| 3,262,379 | 7/1966 | Bauer | 95—4.5 |

JOHN M. HORAN, *Primary Examiner.*